US012658977B2

(12) United States Patent
McMillan et al.

(10) Patent No.: US 12,658,977 B2
(45) Date of Patent: Jun. 16, 2026

(54) RFID PORTAL TARGETING

(71) Applicant: Clairvoyant Technology, Inc., Durham, NC (US)

(72) Inventors: Scott McMillan, Apex, NC (US); Thomas J. Frederick, Chapel Hill, NC (US)

(73) Assignee: Clairvoyant Technology, Inc., Durham, NC (US)

( * ) Notice: Subject to any disclaimer, the term of this patent is extended or adjusted under 35 U.S.C. 154(b) by 0 days.

(21) Appl. No.: 19/044,086

(22) Filed: Feb. 3, 2025

(65) Prior Publication Data

US 2025/0253891 A1     Aug. 7, 2025

Related U.S. Application Data

(63) Continuation of application No. 18/036,830, filed as application No. PCT/US2021/057685 on Nov. 2, 2021, now Pat. No. 12,218,715.

(60) Provisional application No. 63/116,438, filed on Nov. 20, 2020.

(51) Int. Cl.
*H04B 5/77* (2024.01)
*G06K 7/10* (2006.01)

(52) U.S. Cl.
CPC ........... *H04B 5/77* (2024.01); *G06K 7/10366* (2013.01)

(58) Field of Classification Search
CPC ... H04B 5/77; H04B 1/10; H04B 4/50; H04B 4/80; G06K 7/10366; G06K 7/10009
See application file for complete search history.

(56) References Cited

U.S. PATENT DOCUMENTS 10,438,033 B1 * 10/2019 Solomon ............ G06K 7/10415

* cited by examiner

*Primary Examiner* — Matthew Mikels
(74) *Attorney, Agent, or Firm* — Kilpatrick Townsend & Stockton, LLP

(57) ABSTRACT

Aspects and features of this disclosure include operating an RFID reader to identify targeted tags and background tags from among a population of RFID tags. The background tags are then monitored by reading the background tags at a background rate and the targeted tags are tracked by reading the targeted tags at an enhanced rate. The enhanced rate is significantly greater than the background rate. The tags from a large population can be segregated into the two subpopulations based on read measurements stored in a tag database. A tag may become "targeted" by moving towards or appearing near a portal of interest. Tag detection, and therefore an alarm message or some other desired result, can be provided quickly due to the higher, enhanced read rate being applied to the targeted tags.

20 Claims, 6 Drawing Sheets

RFID PORTAL TARGETING

CROSS-REFERENCE TO RELATED APPLICATIONS

This application claims priority to U.S. patent application Ser. No. 18/036,830, filed May 12, 2023, which is the National Phase of and claims priority to International Patent Application PCT/US21/57685, filed Nov. 2, 2021, which claims priority to U.S. Provisional Patent Application 63/116,438, filed Nov. 20, 2020, the entire disclosure of all of which is incorporated herein by reference.

TECHNICAL FIELD

The present disclosure relates generally to radio frequency identification (RFID) systems. More particularly, though not exclusively, the present disclosure relates to systems that determine precise location information for an RFID tag in an environment where multiple RFID tags are present.

BACKGROUND

RFID systems include, at least, an RFID reader and an antenna. The antenna is used by the reader to transmit interrogation signals to RFID tags and receive responses from the RFID tags. RFID systems can use multiple antennas to establish various interrogation zones in which tags can be detected. In many applications it is useful to know location information about the tag with relatively high precision in order to determine if and when a particular RFID tag passes through a portal or moves from one interrogation zone to another, such as in retail loss prevention, race timing, document tracking, conveyor systems, etc. Localizing a tag in an environment with many tags in the system can be challenging due to low tag read rates. Thus, specialized switched beam or phased array antennas are typically used in such environments if precise tag localization is needed.

SUMMARY

Aspects and features of this disclosure include a method of RFID portal targeting using an RFID reader. The method includes interrogating a population of radio-frequency identification (RFID) tags using the RFID reader, and identifying, based on the interrogating, at least one targeted tag and at least one background tag from among the population of RFID tags. The method also includes monitoring the background tag by reading the background tag at a background rate, and tracking the targeted tag by reading the targeted tag at an enhanced rate. The enhanced rate is greater than the background rate. Aspects and features of this disclosure also include an RFID reader that further includes a processor that is operated by instructions executable to perform the operations of a method such as just described. Aspects and features of this disclosure also include a non-transitory storage medium with instructions to perform the operations of a method such as just described.

In some examples, aspects and features can include selectively configuring an RFID tag as a targeted RFID tag or a background RFID tag based on read measurements stored in a tag database. In some examples, aspects and features can include sending a detection alarm message to an RFID client in response to a location or a movement of a targeted RFID tag from among the targeted tags. In some examples, sending the detection alarm message can include accessing sequential carrier phase measurements for a targeted RFID tag from the tag database and extracting motion information features from the sequential carrier phase measurements to provide an alarm detection mapping.

DETAILED DESCRIPTION

Certain aspects and features of the present disclosure relate to a system that improves, and makes more efficient, the localization and interrogation of RFID tags in an environment with many tags in the relative vicinity of an RFID reader. Certain aspects and features of the present disclosure provide accurate, up-to-the-second location and information from an RFID tag in a multi-tag environment without the use of specialized antennas. Tags of interest are identified and monitored more closely than other tags. More specifically, tags of interest are automatically identified from a population of RFID tags and are read at an enhanced rate as compared to other tags. For example, a tag may become "targeted" by moving towards or appearing near a portal of interest, such as the door of a store or other enterprise. Once a tag is targeted due to its proximity to a portal or some other indicator of interest, the targeted tag is tracked more closely, including being read at an enhanced rate. In some examples, a database of read measurements is maintained in real-time in order to provide data for decisioning as to whether a specific tag is to be treated as a background tag or a targeted tag.

In some examples, RFID tags are configured as a targeted tag or a background tag based on select or deselect commands sent by the reader to specific tags. Tags can be moved by the RFID reader between sub-populations as warranted by current readings and historical read measurements contained in the tag database. In some examples, a detection alarm message can be generated in response to the location or the movement of a targeted RFID tag. Detection, and therefore the alarm message, can be provided quickly due to the higher, enhanced read rate being applied to the targeted tags. Such a fast response is not possible when attempting to closely monitor an entire population of tags in a complex environment due to low read rates that result from the reader dealing with signals from so many tags simultaneously.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
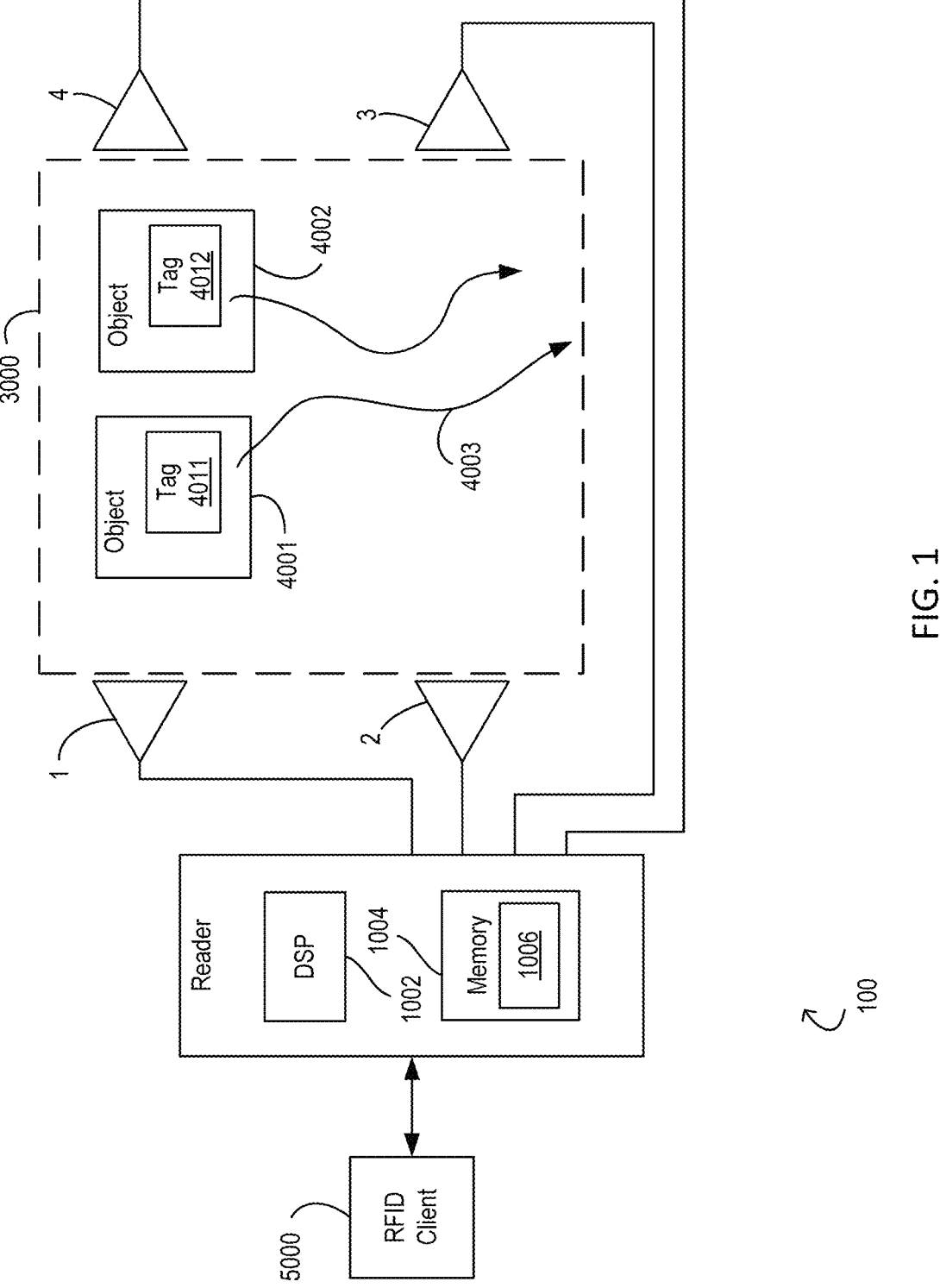
FIG. 1 is a block diagram of an operating environment for an RFID system with tagged objects in motion through an interrogation zone according to certain aspects of this disclosure.

FIG. 1 shows a block diagram of the operating environment of an example RFID reader 1000 used for reading RFID tags on tagged objects such as object 4001 and object 4002 in and near an interrogation zone or "portal" 3000, each moving along a path, such as path 4003. Two objects are shown as an example in FIG. 1, although the actual number of objects varies. The reader 1000 is attached to one or more antennas, where FIG. 1 shows four antennas as an example: antenna 1, antenna 2, antenna 3, and antenna 4. These antennas are typically connected to the reader using coaxial cable, although the antennas could be connected using waveguides, microstrip, stripline, or some other technique. This example includes four antennas, but any number of antennas may be used. The tagged object 4001 has RFID tag 4011 attached and the tagged object 4002 has RFID tag 4012 attached. Typically, there is one tag attached to each object, although in some applications there could be more than one tag attached to some items, such as when the item may be challenging to read from all angles. The RFID reader 1000 may be connected to RFID client 5000 which uses the RFID information for some application purpose. In some examples, the RFID client 5000 may execute some portion of the RFID tag targeting algorithm(s) described herein. This division of the computational load may be used, for example, when the reader 1000 is computationally constrained and simply passes the observable information to client 5000, which includes more computational capability.

In order to implement the functions of the RFID reader 1000, a general-purpose processor such as DSP 1002, a microcontroller, an embedded controller, or a microprocessor can be used and firmware, software, or microcode can be stored in a tangible or non-transitory storage medium that is associated with a processor, such as memory 1004. Such a storage medium may be a memory integrated into the processor, or may be a memory chip that is addressed by the processor to perform control functions. Such firmware, software or microcode includes instructions 1006 executable by the processor and when executed, cause the processor to perform its targeting and monitoring functions. Such firmware or software can also be stored in or on a tangible medium such as an optical disk or traditional removable or fixed magnetic medium such as a disk drive used to load the firmware or software into an RFID reader.

All the tags in the environment, including tag 4011 and tag 4012, use the RF carrier signal from the reader 1000 as the medium to communicate back to the reader via backscatter modulation. The tags modulate their radar cross section to vary the amount of the reader's RF carrier which is reflected to the reader. This backscatter modulated RF signal may be received by one or more of the reader's antennas and passed into the RFID reader 1000 for processing. Note that although the examples described herein are focused on ultra-high frequency (UHF) band RFID, the methods and apparatus described herein can readily be applied to readers operating in the 2.45 GHz microwave band, or other RFID readers, and to various protocols used in the UHF or microwave bands. Henceforth in this disclosure, a tag may refer to "the tag" or the "RFID tag" without specifically referring to tag 4011 or tag 4012. The RFID reader 1000 and/or client 5000 can target multiple tags simultaneously through the disclosed processes operating in software or hardware.

Many RFID applications are intended to detect that a tagged object moves into or through the interrogation zone.

For example, such applications are used in loss prevention systems such as at the entry/exit of retail stores, in baggage handling portals, at distribution center dock doors, and so on. The problem of detecting tags with high reliability when a tagged object moves into the interrogation zone 3000 while reliably rejecting tagged objects, which are outside the interrogation zone, can be especially difficult to deal with in environments with many tags. Due to multipath effects in UHF and microwave RFID systems, it is not typically possible to control or prevent the reading of stray or "background" tags, which are not in or near the interrogation zone 3000. These background tags need to be rejected reliably, i.e., the system should have a low probability of false alarm on background tags not in the interrogation zone, while maintaining a high probability of detection for tags that move into the interrogation zone.

This interrogation zone detection problem is particularly challenging in backscatter RFID systems which are based on an RFID protocol specification known by the name RAIN, Gen2, ISO18000-6C, and other common names. Throughout this disclosure this specification may be referred to as RAIN, or RAIN RFID. The RAIN protocol allows for hundreds of tags using the same wireless communication channel, which requires arbitration by the reader 1000 and limits the number of tags per second that can be read by the RFID reader, also known as the reader's throughput. If there are many background tags, these background tags can significantly reduce the read rate for tags that are approaching or going through the interrogation zone. This reduced read rate for tags can lead to missing a tag that passes into the interrogation zone.

The examples disclosed herein provides a way to enhance the read rate of "targeted" tags, or tags that are statistically of interest as compared to other tags, referred to herein as "background tags." The examples disclosed can be implemented to be fully compliant with the RAIN standard yet provide greatly improved sampling for targeted tags, leading to more reliable detection of tags entering the interrogation zone with fewer false alarms. A background tag can be, for purposes of this disclosure, defined as a tag that is not in the interrogation zone of an RFID system, but is still able to be read by the reader. A background tag can also, or alternatively, be defined, for purposes of this disclosure, as a tag that is not in or near the interrogation zone, irrespective of whether it can be read by the reader at the present time. A targeted tag can be, for purposes of this disclosure, defined as a tag that is of interest for position or motion tracking purposes, such as one that is statistically more likely to be moving towards and/or passing through a portal or interrogation zone of the RFID system.

Figure 2:
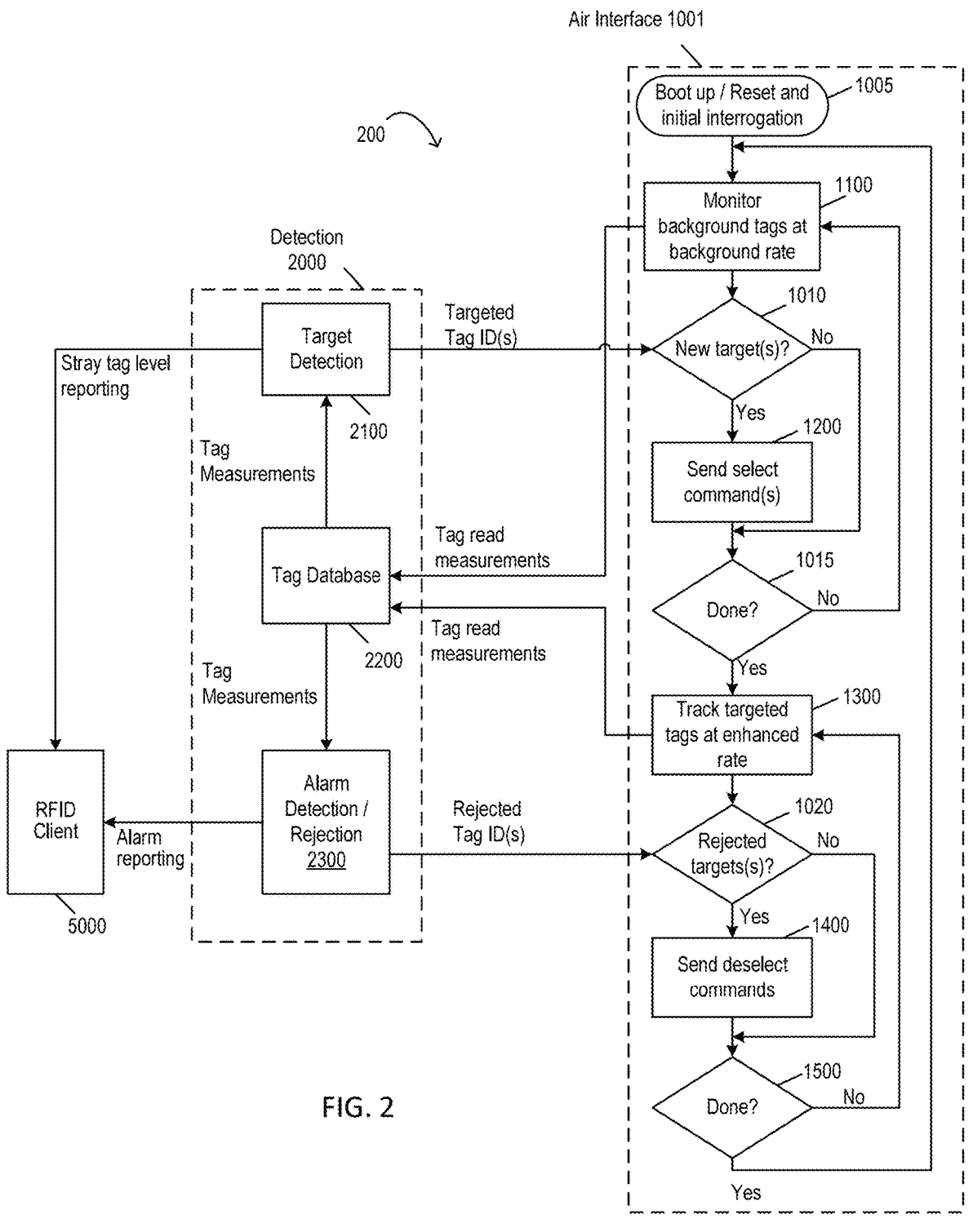
FIG. 2 is a flow diagram of one example of a system for RFID portal targeting according to aspects of this disclosure.

FIG. 2 shows an example of the RFID tag targeting system 200 running within RFID reader 1000. The air interface module 1001 is a programming or software module responsible for the communication with and control of reading tags in the tag population. The air interface module 1001 generates tag read measurements as it inventories the tag population energized by the reader antennas 1, 2, 3, and 4 as shown in FIG. 1. This disclosure will use the words "energized", "illuminated", or "activated" interchangeably. The reader's transmit signal is responsible for providing power to the tags. Terms such as "energized," "illuminated," or "activated" are used to indicate that a tag is receiving sufficient radio power from its antenna to be powered on and interact with the reader. The tag read measurements produced by the air interface module 1001 may include identification numbers, such as electronic product codes, a receive signal strength indicator (RSSI), channel receive I/Q phase, channel carrier frequency, arrival time, and/or other statistics. Tag read measurements are stored in tag database 2200, which is part of the detection module 2000 in FIG. 2.

The detection module 2000 in this example is a software or programming module responsible for determining which tags in the tag database should be targeted, which targeted tags are no longer interesting or relevant as a target, and/or which targeted tags should be "alarmed on" as having entered the interrogation zone. The detection module sends alarm event information to the RFID client 5000 and may also take other actions such as triggering audible and/or visual alarms at or near the reader. The detection module 2000 may also send background tag level reporting to the RFID client. Background tag levels may be useful because the RAIN RFID protocol provides for only limited throughput, in tag reads per second. This limited throughput can lead to saturating the tag communications channel, depending on what session is being used, as discussed below. Background tag level notifications from the RFID reader 1000 may be used by loss prevention personnel to adjust the position of tagged items placed too close to the interrogation zone.

As an example, the air interface module 1001 runs a process starting at block 1005, which includes startup, initialization, and initial interrogation of the population of tags to separate the tags into subpopulations to be maintained and monitored. After initialization and initial interrogation is complete, the air interface module moves to block 1100 to monitor the background tags by reading the background tags at a lower, background rate. The reader may read tags in block 1100 in accordance with a specification such as ROspec, a publicly available, low level reader protocol standard. ROspec is short for "Reader Operation Specification." An ROspec defines the basic air interface functionality while this ROspec is running. Referring to the RAIN RFID specification regarding "sessions", ROspec uses session 1 singulation from the A to B state. This concept of "session 1 singulation from the A to B state" is discussed below.

RAIN RFID tags have four binary "session" flags, each of which can be in one of two states referred to as "A" or "B." The session flag used to for a tag read is set by the RFID reader. Only one session flag can be used at a time. "A" is the default state for all the session flags after a prolonged period of no power. Session flags have a defined "persistence" property, which is the time value for how long an RFID tag will maintain the session flag state in the B state, without RF power. This persistence behavior is summarized below:

| Session | When RF power is removed | While RF power is supplied |
|---------|--------------------------|----------------------------|
| 0 | Immediately changes from B state back to A state | Infinite persistence, meaning it never changes from B back to A |
| 1 | From 500 milliseconds to 5 seconds | From 500 milliseconds to 5 seconds |
| 2 | Greater than two seconds | Infinite persistence, meaning it never changes from B back to A |
| 3 | Greater than two seconds | Infinite persistence, meaning it never changes from B back to A |

The session flags can allow multiple readers in proximity to perform inventory operations in different sessions, possibly reducing interference between the readers. Individual tags can only participate in an inventory operation in a single session at a time. For example, if a particular tag is participating in an inventory operation in session 0, that tag will ignore incremental inventory commands from readers operating in different sessions. This arrangement can help reduce logical crosstalk between adjacent readers and the tag population they are trying to inventory.

The different persistence values of the four session flags are intended to aid in inventory accuracy in various applications. For example, in environments with low tag populations and potentially fast-moving tags, session 0 can be used because passive tags are ensured to become powered on in the "A" state for session 0. Inventory operations focus on tags with a specified session (0, 1, 2, or 3) and that session's state, A or B. As the reader inventories tags, those tags' session flags get toggled from their current state to the opposite state, i.e., A to B, or B to A. If the reader removes RF power, all the tag's session 0 flags return to state A.

In some applications it can be useful for a session flag to maintain the B state even when there are brief interruptions in RF power, such as when the reader needs to switch antennas or carrier frequencies. Sessions 1, 2, and 3 all exhibit the property of a finite persistence while the tag is de-energized. Sessions 2 and 3 maintain the B state at least 2 seconds without power. This persistence can be useful when inventorying large tag populations since inventoried tags will remain in the B state and can remain quiet while the reader inventories the remaining tags, changing the states from A to B.

Session 1 behavior is different from the others in that the session 1 flag B state expires after a specified period whether or not RF power is being applied. As suggested in the table above, the session 1 flag will change from B to A after from 500 milliseconds to 5 seconds. Thus, the session 1 state persistence is bounded. Typical RAIN tag designs provide for the session 1 flag to have persistence of approximately 1 second at room temperature. The tag targeting process described in this disclosure utilizes the bounded persistence property of session 1 to monitor a background tag population reliably, by reading the tags whose session 1 flag is in the A state. This monitoring is most effective if the reader's throughput (in tags per second) times the actual persistence time (for example, 1 second) is greater than the tag population, i.e., $$\text{Throughput} \cdot \text{Persistence} \geq \text{Tag Population}$$

For example, if the reader's throughput is 200 tags/second, the persistence is 1 second, and the tag population is 300 tags, then the inequality does not hold and the system does not have sufficient throughput to singulate all tags from the A state to the B state before the previously read tags start spontaneously flipping back to the A state, and start being read again. Singulation is the identification of a specific tag, for example, by determining the tag's specific serial number. In this example, the tag population is too large to reliably keep the background tag inventory session 1 flags in the B states. However, if the tag population were 100 tags, then the reader will have singulated all tags from A to B, quieting them, before tags start flipping back to A to be reread. Reliable and accurate inventory in this example can thus be provided with 100 tags instead of 300 tags.

In the examples below, the RFID tags also have a "select" flag. The select flag is a binary flag considered to be "true" (selected) or "false" (not selected). The select flag has the same persistence as the session 2 and session 3 flags. The select flag can be set to true or false using a select command. The select flag is utilized in the targeting process described herein to configure each targeted tag for an enhanced read rate, as compared to background, stray tags, which are only to be read occasionally, gated by session 1 persistence to monitor their status.

Continuing with FIG. 2, at block 1100, the processor executing air interface module 1001 inventories all tags whose session 1 flag is in the A state and whose select flag is false, illuminated by any of the antennas. After background tag monitoring is complete, any tags that responded and were inventoried will have the session 1 flag flipped to the B state and these tags should no longer respond to background tag monitoring queries for the session 1 persistence time, typically around 1 second at room temperature.

During execution of block 1100, tag read measurement statistics are sent to and stored in the tag database 2200. The tag database in this example has a finite data hold time, such as ten seconds or one hour, depending on the application. Longer tag database memory can be useful when there are a great number of tags near the interrogation zone, for example, hundreds or thousands of tags. In such cases, there may be background tags near the interrogation zone that occasionally are illuminated due to constructive multipath propagation at the tag. Having a longer tag database memory can help the system "remember" and recognize such tags as "known" background tags. Each new read measurement of such a stray tag may trigger the target detection block 2100 to determine if the background tag should be targeted, based on the new read measurements and information on past reads from the tag database 2200. The target detection block 2100 determines whether the tag is located in an unexpected place or is moving in an unexpected way, and thus should be targeted, as opposed to displaying statistically the same behavior as its history indicates, which case it should remain configured as a background tag.

The target detection block 2100 takes the tag measurement history from the tag database 2200 and determines if a tag should be targeted for reading at the enhanced read rate. The target detection block 2100 sends target selection messages to the air interface module 1001, and at block 1010, the air interface module determines if there are additional tags to target. If there are no new tags to be targeted, then stop conditions for background tag monitoring are checked at block 1015. However, if there are now additional tags to target as determined at block 1010, select commands are sent at block 1200 to the tag population to target these specific new tags. The select command will target a specific tag to set its select flag ("SL flag") to "true." Once the tag's SL flag is set to true, the tag will no longer participate in the background tag monitoring in block 1100, but instead the tag will participate in targeted tag tracking inventory rounds in block 1300, as discussed below. At block 1015, the stopping conditions for background monitoring may be time based, or based on some specific number of antenna rounds to process, or some other criteria. If further background tag monitoring is needed, then additional inventory of any tags with that SL flag set to false and session 1 flag in the A state will be taken at block 1100.

If an interval of background tag monitoring in FIG. 2 ends at block 1015, the processor executing the air interface module performs targeted tag tracking at block 1300 to inventory all tags illuminated by any of the antennas whose select flag is true. The processor tracks the targeted tags by reading the targeted tags at an enhanced rate. In this example, targeted tags have the SL flag set to true. This sub-population of tags will typically be in the vicinity of the antennas and be readable by the RFID reader 1000.

Within block 1300, the reader is configured to send inventory query commands for any tags whose SL flag is true and session 0 flag is in the A state. When these tags are read, their session 0 flags are flipped to the B state. Optionally, the air interface module can be configured to also then read the tags with the SL flag set to true and with session 0 flag in the B state, thereby flipping their session 0 flags back to the A state. Reading session 0, B-state tags may provide superior performance in some environments where other nearby readers may have set the session 0 flag to the B state and are close enough to keep the tag energized so that the session 0 flag does not reset to the A state.

During execution of block 1300, tag read measurements are sent to the tag database 2200. The processor executing the alarm detection/rejection block 2300 takes the tag statistical history from the tag database 2200 and determines if a tag should be alarmed on, causing alarm reporting to the client 5000. The alarm detection/rejection block 2300 sends target rejection messages to the air interface module 1001, and at block 1020, a determination is made as to whether there are targeted tags to reject (deselect). If there are no targeted tags to deselect, then a determination is made at block 155 as to whether stop conditions for targeted tag tracking exist. However, if there are now tags to be de-targeted because of the check at block 1020, RAIN select commands are sent out to the tag population at block 1400. The select command will be for a specific tag, to clear (deselect) its SL flag to false. Once the tag's SL flag is set to false, the tag will no longer participate in the targeted tag tracking at block 1300, but instead will participate in background inventory rounds at block 1100, as discussed previously.

At block 1500, the stopping conditions for targeted tag tracking may be time based, or some specific number of antenna rounds to process, or some other criteria. If the targeted tag tracking is to continue, then control is passed back to block 1300 wherein additional inventory of any tags with a true SL flag will take place. If at block 1500 it is determined that targeted tag tracking should end, then control is passed back to the beginning of the process at block 1100.

There are many possible options and variant examples of this process that fall within the scope of this disclosure. For example, the logical meaning of the SL flag could be inverted, meaning SL=true would indicate a background tag and SL=false would indicate a targeted tag. This arrangement is an inversion of the meaning of the SL flag for targeting. In practice it means that the SL flag must be set true for the tag to be in the background sub-population. It is sometimes difficult to set the SL flag on a very low signal strength tag, and this difficulty can be problematic since the tag will be stuck in the targeted population until its SL flag can be set. Another option is to inventory background tags in both A and B states in session 1 at block 1100. This technique may be advantageous when there are very few background tags and higher sampling rates and/or more sensitive background tag monitoring is required.

Figure 3:
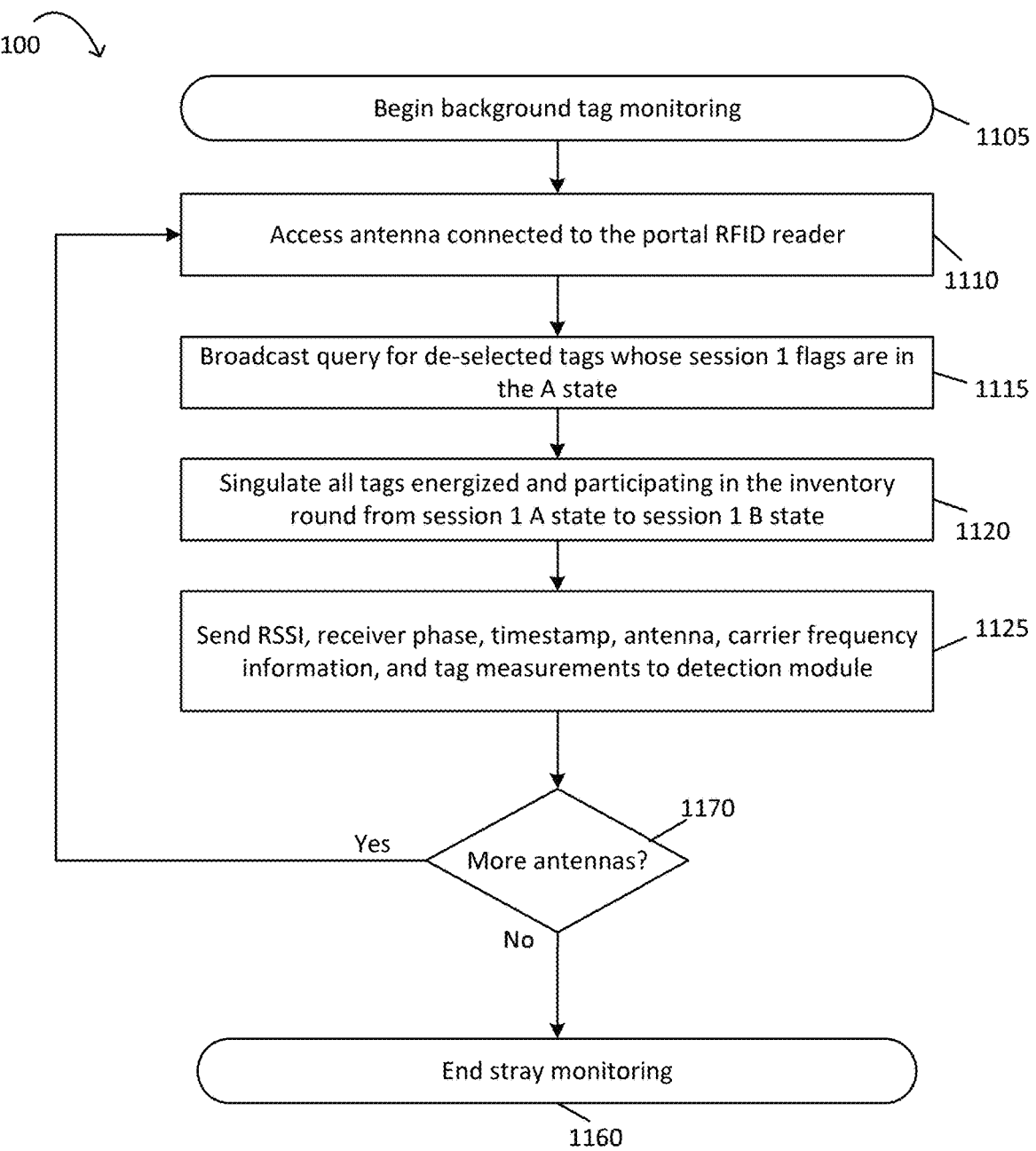
FIG. 3 is a flowchart of an example of a process for background tag monitoring according to aspects of this disclosure.

FIG. 3 is a flowchart of an example of the process 1100 for background tag monitoring according to aspects of this disclosure. Process 1100 may follow the ROspec previously discussed. The background monitoring begins at block 1105 and proceeds to block 1110 where the processor sets radio control parameters such that the radio will sequence through each of the attached antennas. At block 1115, the reader broadcasts the query command for untargeted tags whose session 1 flags are in the A state. These tags may be new arrivals into the interrogation zone area, or these tags may have been previously read background tags whose session 1 persistence has expired, meaning the tag has flipped back to the session 1, A state. At block 1120, all tags participating in this inventory round are identified and the tag read measurements are sent to the tag database. All tags read in block 1120 have their session 1 flags set to the B state and should then remain in the session 1, B state until the persistence expires about one second later. In block 1125, all tag read measurements are sent to the tag database 2200 within the detection module 2000.

In another example, each individual tag read measurement is written in the tag database as the tags are read at block 1120. Continuing to block 1170, the processor determines if there are additional antennas to sequence through, and if so, process 1100 returns to block 1110, where the radio control sets the radio port, starts RF power, and initiates other radio control plane items as needed. If at block 1170 there are no more antennas in the sequence, then this tag inventory is completed at block 1160. Completion of the inventory of tags in some examples entails updating stored variables, for example, as the tag population estimate. Such updates can be based on the previous inventory rounds.

Figure 4:
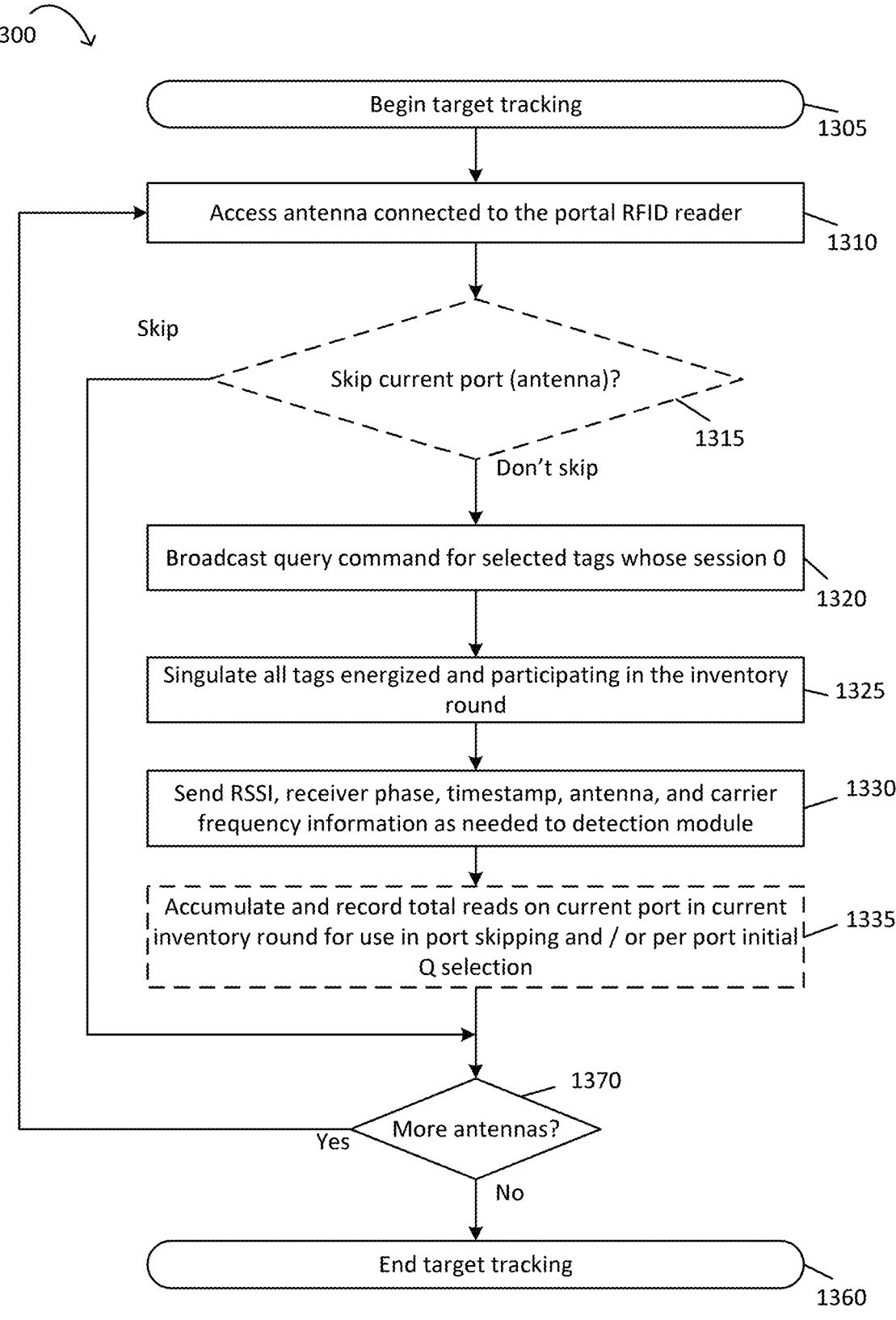
FIG. 4 is a flowchart of an example of a process for targeted tag tracking according to aspects of this disclosure.

FIG. 4 is a flowchart of an example of the process 1300 for targeted tag tracking according to aspects of this disclosure. Process 1300 begins at block 1305 and proceeds to block 1310 where the processor sets radio control parameters such those that determine whether and how the radio will sequence through each of the attached antennas. In some examples, a determination is made at block 1315 as to whether one or more antenna ports should be skipped. At block 1315, the processor optionally determines whether the current antenna has had no recent session 0 reads. If so, the antenna(s) may be skipped for one or more loops to focus more air interface time on antennas dealing with activated, targeted tags. For example, an antenna may be skipped for two executions of the process of block 1300 if there were no tag reads on the most recent use of the antenna. For antennas with no activated targeted tags, this skipping can reduce the overhead of channel throughput by as much as 66% for each antenna with no active tags. The disadvantage of this option is a potential delay in reading moving targeted tags because such tags would otherwise be read using the skipped antenna. If an antenna is optionally skipped, control is passed to block 1370. If the antenna is not skipped at block 1315, process 1300 continues at block 1320, where the reader broadcasts the session 0 query command for targeted tags.

At block 1325, all tags participating in this inventory round are identified and the tag read measurements are sent to the tag database. In one example, all tags read in block 1325 have their session 0 flags set to the B state and then remain in the session 0, B state until the reader optionally singulates them back to the session 0, A state, or until the tags become de-energized due to an antenna hop or frequency hop. In block 1330, tag read measurements are sent to the tag database 2200 in the detection module 2000. In another example, each individual tag read measurement is sent to the tag database as the tags are read at block 1325. Continuing to optional block 1335, reader state variables are updated to keep track of tag populations and tag read counts for possible antenna skipping and for setting the initial frame size, or "Q", are updated for future inventory rounds.

Continuing to block 1370 of FIG. 4, a determination is made by the processor as to whether there are additional antennas to sequence through, and if so, control returns to block 1310. If at block 1370 there are no more antennas in the sequence, then the this sequence of inventory is completed at block 1360. Completion of the inventory of tags in some examples entails updating stored variables, for example, as the tag population estimate. Such updates can be based on the previous inventory rounds. In some examples, computer program code instructions implementing the functions described above with respect to FIG. 4 together with DSP 1002 provide a means for tracking at least one targeted tag by reading targeted tags at an enhanced rate.

In the examples presented herein, session 0 is used for targeted tag tracking because tags respond very quickly to session 0 messages. Since the state does not change on its own in session 0 and the tags respond quickly, the reader need not take the state into account, although in most cases the session 0 state would be flipped between A and B with singulation or certain messages just as with session 1. With tag background monitoring, by contrast, it can be useful to know when and if a tag has been singulated, therefore state changes between A and B are tracked. The fixed persistence of session 1 allows the reader to "know" when the tag has not been read recently. Session 2 and session 3 messaging is not useful for tag tracking as described herein due to these session's infinite persistence and long state changes.

In the examples disclosed herein, enhanced read rates for targeted tag tracking are typically many times the background read rates used for background tag monitoring. In one example, background tag read rates can be from 0.5 to 1.5 reads per second. In another example background tag read rates can be from 1 to 1.2 reads per second. In some examples, enhanced read rates for targeted tags can be from 100 to 1000 reads per second. In other examples, enhanced read rates for targeted tags can be from 600 to 900 reads per second.

Figure 5:
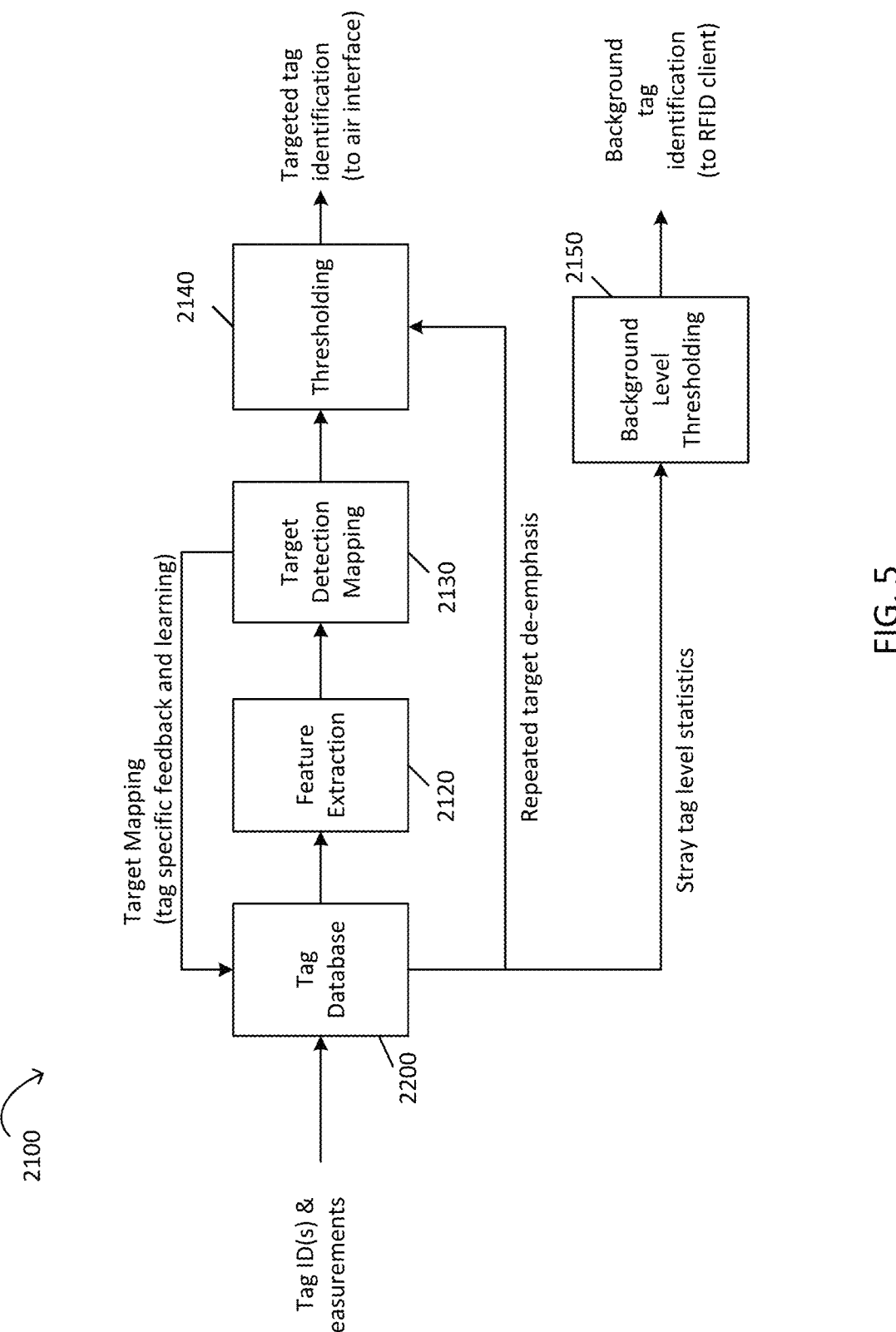
FIG. 5 is a block diagram of one example of a target detection system according to aspects of this disclosure.

FIG. 5 is a block diagram of one example of a target detection system according to aspects of this disclosure. The tag database 2200 contains the raw tag measurement history for each tag the reader 1000 has seen within its database hold time. The tag database 2200 sources this data to feature extraction function 2120, which extracts features from the data. The feature extraction takes the data from the database and parameterizes the data from the tag database to produce parameters and their values for an RFID tag, summarizing the features of the data. In this example, parameterization of the raw measurement data is a part of the detection process. The raw measurement data has too high a dimension; therefore, a compression algorithm is used to reduce the salient features of interest into a smaller-dimension dataset of parameters, which is more easily used as a test statistic. Examples of parameters include received signal strength trends, antenna diversity changes, changes in the phase angle of the carrier signal, and trends in the phase angle of the carrier signal. The extracted features are passed to the target detection mapping function 2130, which maps the parameters to provide a target detection mapping. The mapping function 2130 takes the reduced dimension feature set for the background tag and maps it to a final decision statistic which is passed to the thresholding function 2140. In an example implementation, the mapping function produces a weighted sum of RSSI values and phase trends. The mapping function 2130 may also optionally provide feature feedback to the tag database 2200. This tag-specific feedback from the target detection mapping can be stored in the tag database to update some adaptive states specific to a tag in the tag database. The tag database in this example also stores the adaptive feature filtering states in the database.

The thresholding function 2140 in some examples includes a target detection threshold that adapts based on information from repeated targeting and from rejections stored in the tag database to provide targeted tag identification. This feed-forward effect is shown in FIG. 5 and can also be referred to as repeated target de-emphasis. FIG. 5 also shows the background level thresholding 2150 receiving background tag read information, which may include the number of background tags read in some window of time, or the percentage of total channel throughput consumed by background tag singulation during background tag monitoring. Depending on the required reliability of detection, channel throughput is allocated to the targeted tag tracking. Loss prevention personnel can be alerted regarding excessive background tag levels to reduce tags crowded near the interrogation zone or portal of interest. In some examples, computer program code instructions implementing the functions described above with respect to FIG. 5 together with DSP 1002 provide a means for identifying, based on interrogating RFID tags, at least one targeted tag and at least one background tag from among a population of RFID tags.

Figure 6:
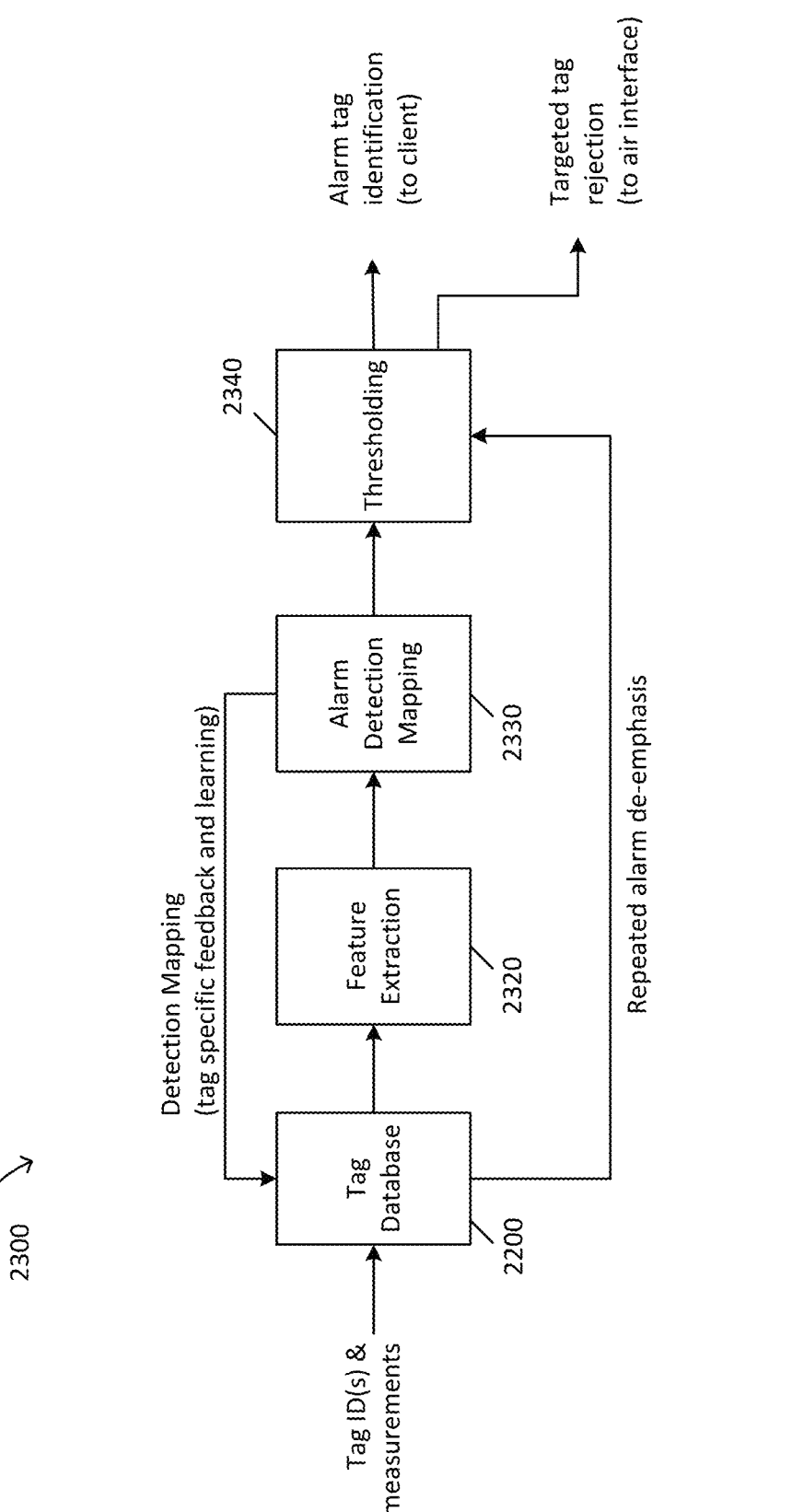
FIG. 6 is a block diagram of one example of an alarm detection system according to aspects of this disclosure.

FIG. 6 shows a block diagram of the alarm detection/rejection system. The tag database 2200 contains the raw tag measurement history for each tag the reader 1000 has seen within its database hold time. The tag database 2200 sources this data to feature extraction function 2320. The extracted features generated from function 2320 may be specialized for targeted tags with high read rates, such that motion information features can be extracted from the sequential carrier phase measurements stored in the tag database. The extracted motion information features are passed to the alarm detection mapping function 2330 and mapped to provide an alarm detection mapping. The mapping function 2330 produces a reduced-dimension set of motion information features for the targeted tag and maps it to a final decision statistic as an alarm detection map, which is passed to the thresholding function 2340. In one example, the mapping function produces a weighted sum of motion estimates across the antennas used. The thresholding function thresholds the alarm detection mapping, that is, determines if the interrogation zone alarm state should be sent to the RFID client 5000. The thresholding function also determines whether the tag should be rejected or de-targeted. If the tag is to be de-targeted, then a deselect command message is sent to the air interface module 1001.

The mapping function 2330 may also optionally provide feature feedback to the tag database 2200. This feedback may update some adaptive states specific to the tag in the tag database. The tag database in this example stores the adaptive feature filtering states for a tag. In some examples, the thresholding function 2340 may include an alarm detection threshold that adapts based on repeated alarming and/or rejection information stored in the tag database. This feed-forward effect may also be referred to as repeated alarm de-emphasis and is shown in FIG. 6.

The examples disclosed herein provide a way to separate total channel throughput in reads per second between targeted tags and background tags. The system does so by alternating between at least two reader operation modes: one mode to inventory background tags and keep those background tags in a "quiet" state by using session 1 messaging; and a second mode that repeatedly reads targeted tags using session 0 messaging to generate a significantly higher read rate for targeted tags so that feature extraction and alarm detection for targeted tags is based on an enhanced data set. Thus, the targeting process allows total channel throughput to be utilized efficiently and weighted towards targeted tags. The SL flag can be used for targeting tags.

There are many other possible variations of RFID portal targeting that are consistent with this disclosure. In one example a system could use session 2 or session 3 for targeted tag tracking if it also singulates tags back from the B state to the A state. In another example, the select commands in blocks 1200 and 1400 of FIG. 2 transmitted during the tag monitoring and tag tracking loops, respectively, can be placed inside blocks 1100 and 1300, respectively. For example, when select commands need to be sent to change a tag from background to targeted, the select operations could be kept in a queue and the select command transmitted only when the tag is seen. This technique may optimize the efficacy of the select command by transmitting it on an antenna and carrier frequency that is "known" to be effective for reaching the tag at the particular time. Likewise, select commands needed to de-target a tag could be queued for transmission and transmitted when the tag is seen to ensure the tag "hears" and executes the command, changing its SL flag so that it is no longer a targeted tag.

The reader described as an example in this disclosure may be implemented using a discrete component RFID reader design, such as one based on physically separate chips for DACs, ADCs, mixers, amplifiers, couplers, and the like. A processing function for a reader, as well as additional functional bocks or circuits in the reader can be implemented on a field programmable gate array (FPGA), or on an application specific integrated circuit (ASIC). A reader may also be implemented as a system-on-a-chip (SoC), wherein many of the subsystems are integrated together on a chip. Sometimes multichip SoC solutions can be used to ease manufacturability given the variations in process which may be required based on frequency, power, and the like.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A method comprising:
accessing a database of stored radio-frequency identification (RFID) tag measurement data including motion information features from sequential carrier phase measurements for an RFID tag;
parameterizing the stored RFID tag measurement data into a reduced-dimension dataset of the motion information features;
applying a target detection mapping function including signal strength values and phase trends to the motion information features from the reduced-dimension dataset to produce a decision statistic value; and
storing the decision statistic value.

2. The method of claim 1, further comprising:
detecting the RFID tag;
comparing the decision statistic value to a current value of an adaptive target detection threshold; and
producing an alarm condition for the RFID tag based on the comparing of the decision statistic value to the current value of the adaptive target detection threshold.

3. The method of claim 2, further comprising transmitting a detection alarm message to an RFID client in response to the alarm condition.

4. The method of claim 1, wherein the target detection mapping function comprises:
accessing sequential carrier phase measurements for the RFID tag from the database;
extracting motion information features from the sequential carrier phase measurements; and
mapping the motion information features.

5. The method of claim 1, wherein the decision statistic value is a weighted sum of a received signal strength indicator (RSSI) value and a phase trend value.

6. The method of claim 5, wherein the reduced-dimension dataset includes values for an RSSI trend, an antenna diversity change, a carrier phase angle change, and a carrier phase angle trend.

7. The method of claim 1, further comprising storing tag-specific feedback from the target detection mapping function in the database.

8. A system comprising:

a radio-frequency identification (RFID) reader;

an RFID client; and a non-transitory storage medium including instructions executable for causing a processor for at least one of the RFID client or the RFID reader to:

access a database of stored radio-frequency identification (RFID) tag measurement data including motion information features from sequential carrier phase measurements for an RFID tag;

parameterize the stored RFID tag measurement data into a reduced-dimension dataset of the motion information features;

apply a target detection mapping function including signal strength values and phase trends to the motion information features from the reduced-dimension dataset to produce a decision statistic value; and store the decision statistic value.

9. The system of claim 8, wherein the instructions are further executable for causing the processor to:

detect the RFID tag;

compare the decision statistic value to a current value of an adaptive target detection threshold; and produce an alarm condition for the RFID tag based on the comparing of the decision statistic value to the current value of the adaptive target detection threshold.

10. The system of claim 9, wherein the instructions are further executable for causing the processor to transmit a detection alarm message to an RFID client in response to the alarm condition.

11. The system of claim 8, wherein the target detection mapping function comprises:

accessing sequential carrier phase measurements for the RFID tag from the database;

extracting motion information features from the sequential carrier phase measurements; and mapping the motion information features.

12. The system of claim 8, wherein the decision statistic value is a weighted sum of a received signal strength indicator (RSSI) value and a phase trend value.

13. The system of claim 12, wherein the reduced-dimension dataset includes values for an RSSI trend, an antenna diversity change, a carrier phase angle change, and a carrier phase angle trend.

14. A non-transitory storage medium storing executable instructions, which when executed by a processor, cause the processor to perform operations comprising:

accessing a database of stored radio-frequency identification (RFID) tag measurement data including motion information features from sequential carrier phase measurements for an RFID tag;

parameterizing the stored RFID tag measurement data into a reduced-dimension dataset of the motion information features;

applying a target detection mapping function including signal strength values and phase trends to the motion information features from the reduced-dimension dataset to produce a decision statistic value; and storing the decision statistic value.

15. The non-transitory storage medium of claim 14, wherein the instructions cause the processor to perform operations comprising:

detecting the RFID tag;

comparing the decision statistic value to a current value of an adaptive target detection threshold; and producing an alarm condition for the RFID tag based on the comparing of the decision statistic value to the current value of the adaptive target detection threshold.

16. The non-transitory storage medium of claim 15, wherein the instructions cause the processor to perform an operation of transmitting a detection alarm message to an RFID client in response to the alarm condition.

17. The non-transitory storage medium of claim 14, wherein the target detection mapping function comprises:

accessing sequential carrier phase measurements for the RFID tag from the database;

extracting motion information features from the sequential carrier phase measurements; and mapping the motion information features.

18. The non-transitory storage medium of claim 14, wherein the decision statistic value is a weighted sum of a received signal strength indicator (RSSI) value and a phase trend value.

19. The non-transitory storage medium of claim 18, wherein the reduced-dimension dataset includes values for an RSSI trend, an antenna diversity change, a carrier phase angle change, and a carrier phase angle trend.

20. The non-transitory storage medium of claim 14, wherein the instructions cause the processor to perform an operation of storing tag-specific feedback from the target detection mapping function in the database.

* * * * *